April 1, 1952 R. M. PAGE 2,590,884
PULSE ECHO RANGING CATHODE-RAY TUBE SWEEP SYSTEM
Filed Feb. 29, 1944
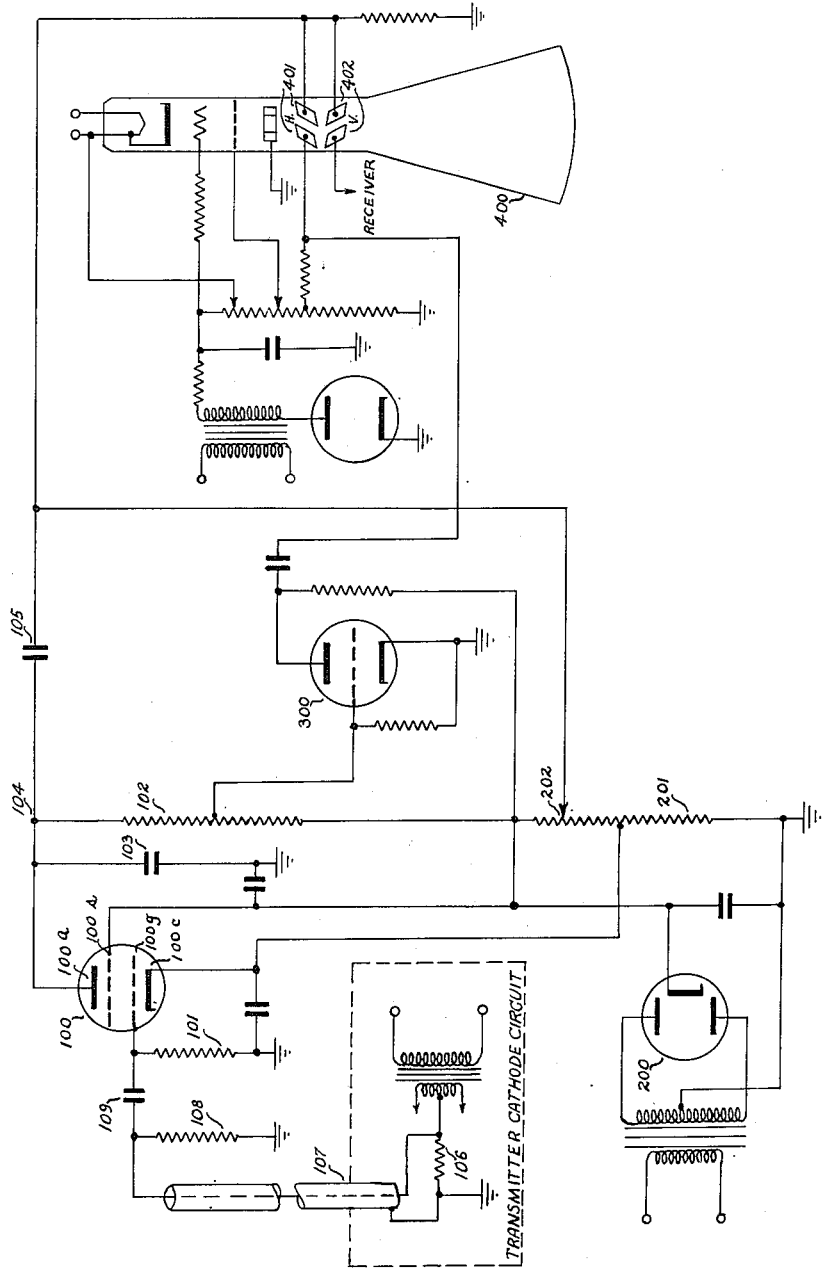
Inventor
ROBERT M. PAGE
By W. Glenn Jones
Attorney Patented Apr. 1, 1952

2,590,884

UNITED STATES PATENT OFFICE 2,590,884

PULSE ECHO RANGING CATHODE-RAY
TUBE SWEEP SYSTEM

Robert M. Page, Washington, D. C.

Application February 29, 1944, Serial No. 524,432

3 Claims. (Cl. 343—13)

(Granted under the act of March 3, 1883, as
amended April 30, 1928; 370 O. G. 757)

This invention relates to a system for measuring small intervals of time with great accuracy, and it is particularly directed to a novel method of determining the elapsed time between a radio pulse transmission and the echo thereof.

In the measurement of small time intervals with great accuracy by electrical means it is customary to compare the interval to be measured with a known interval by applying the intervals in the form of voltage pulses or waves to the deflecting plates or coils of a cathode ray tube and to observe the resulting pattern or trace of the cathode ray on the screen of the tube. In the matter of radio echo ranging this method has proven to be the only practical one since the interval between transmission and echo may be made to appear as a line segment on the screen, the length of which is a function of the elapsed time between pulse and echo, which is, in turn, a direct measure of the range from the reflecting object.

It is obvious, however, that the trace of the cathode ray must be very closely synchronized with the pulse transmission if accurate range finding is to be obtained, and synchronization as close as within 0.01 microsecond for the most accurate work is desirable. The conventional method of synchronizing a cathode ray sweep with some periodic pulses or wave trains, or an alternating voltage, is to initiate the sweep by means of a grid-controlled gaseous discharge tube operating as a relaxation oscillator, and to synchronize the firing (or conduction period) of the tube by applying the synchronizing voltage to its grid. Other synchronizing methods may use more than one tube, depending on the wave form of the sweep desired, but they all are fundamentally the same in that some form of self-excited, or self-operating, oscillator is locked in phase by means of a small synchronizing voltage applied to a grid.

Although the conventional method of synchronization is entirely satisfactory for the measurement and comparison of relatively long time intervals (e. g. 10 microseconds or more), it is not at all suitable for synchronization where the permissible error is a small fraction of a microsecond. This is due to the fact that the synchronizing impulse is unable to lock the oscillator closer than within a definite fraction of a cycle of the oscillator frequency. Thus, synchronizing a 100 cycle oscillator frequency to within 100 microseconds, or one-hundredth part of a cycle, is very accurate synchronization, but it is of no use for accurate radio range finding.

The principal object of the invention is the provision of a system capable of exact synchronism with voltage pulses, timed or aperiodic, applied thereto, for control of the sweep of deflection of a cathode ray. Another object includes the application of this system to a radio echo ranging system for the accurate measurement of the extremely short time intervals occurring between the transmitted pulse and reception of the echo. Other objects will be apparent from the following description, having reference to the accompanying drawing.

The diagram shown in the drawing comprises a sawtooth wave generator including a tube 100, a conventional power supply including a rectifying tube 200, an inverting circuit including a tube 300 and a scanning circuit including a cathode ray tube 400.

In the sawtooth wave generator, the tube 100 has a cathode 100c, a control grid 100g, a screen grid 100s and an anode 100a. The control grid 100g is grounded through a resistance 101, and the tube 100 is kept normally blocked by maintaining the cathode 100c positive with respect to ground. This is done by connecting the cathode 100c to an intermediate point on a power supply resistance 201 which is grounded at its negative end. Positive potential is supplied to the anode 100a from the positive end of the resistance 201 through a load resistance 102. A capacitance 103 is connected between the anode 100a and ground and this charges, on the application of potential to the anode 100a, at a rate determined by its capacity and the size of the resistance 102. On the application of a positive pulse to the grid 100g the tube 100 becomes conducting and the capacitance is immediately discharged, thus dropping the potential at point 104 suddenly to ground. As soon as the positive pulse on the grid 100g is over, the tube 100 again is blocked and the capacitance 103 recharges through the resistance 102 and the potential of the point 104 rises accordingly, thus generating a sawtooth voltage wave which is accurately synchronized with the positive pulses received by the grid 100g. The sawtooth wave is transmitted to one set of deflecting plates 401 (e. g. the horizontal plates) of the cathode ray tube 400 through a capacitance 105, proper bias being maintained on the deflecting plates by a variable tap 202 on the resistance 201. In this way the cathode ray is swept across the screen of the tube 400 in exact synchronism with the pulses received at the grid 100g even though, in many instances, the time between pulses may be very long compared to the time of travel of the cathode ray across the screen. In such instances the voltage on the deflecting plates 401 remains at one extreme and the ray remains removed from the screen until the next pulse occurs. The scanning circuit is of conventional design for use with cathode ray tubes of the electrostatic deflection type. It is obvious that electromagnetic deflection tubes can be used with the appropriate circuit, but the electrostatic type is simpler, and therefore preferred. The capacitance 105 should preferably be considerably smaller than the capacitance 103 to avoid undesirable modulation of the wave developed at the point 104.

Since it is often desirable to apply a greater voltage to the plates 401 than is available from a small power supply, and also to preserve a more linear sweep, part of the wave developed at the point 104 is amplified and inverted in a typical "class A" amplifier formed by the tube 300 and applied to one of the plates 401, the wave at point 104 being applied directly to the other plate, all in conventional manner.

The sawtooth generator including the tube 100 is not a relaxation oscillator, nor for that matter is it an oscillator of any kind. It will generate a sawtooth wave only on the external application of positive pulses to the grid 100g. Where the pulses available are negative, they may first be inverted through a suitable amplifier before application to the grid 100g. However, a simple and eminently satisfactory method of synchronizing the generator with the pulse transmissions of a radio echo ranging transmitter is to obtain the positive pulses by virtue of the potential drop across a resistance or impedance 106 inserted in the cathode circuit of one of the transmitter stages, preferably the final stage. The positive pulses developed across the resistance 106 may be transmitted to the saw-tooth wave generator through a coaxial cable 107, terminated in a resistance 108 to ground, and a small capacitance 109. The time constant of the capacitance 109 and the resistance 101 is selected so that the charge on the capacitance 109 will be dissipated by the time the next pulse arrives.

The echo, as detected and amplified by the radio range finding receiver, may be applied to the other set of deflecting means (e. g. the vertical plates) 402 of the cathode ray tube 400, thus providing a deflection in the trace or pattern formed by the cathode ray as it is swept across the screen by the sawtooth wave generator.

There are a number of modifications which may be made within the scope of the invention. For example, the tube 100 may be of the gas discharge type, but the high vacuum type is preferred for the most accurate and controllable operation. Likewise, multigrid tubes need not be used if an extremely fast discharge rate for the capacitance 103 is not needed, and the inverting circuit using the tube 300 may be omitted if desired. Other means of obtaining the positive voltage pulses for actuating the sawtooth wave generator than the use of an impedance in the cathode circuit of a transmitting stage may be employed, such as an impedance in the high potential side of the transmitter power supply, or an impedance through which rectified grid current flows. However, the use of a cathode impedance (which may be inductive as well as resistive) has proven the most satisfactory in all respects.

Many variations will be apparent to those skilled in the art, and the invention should not be limited other than as defined by the appended claims.

The invention described herein may be manufactured and used by or for the Government of the United States of America for governmental purposes without the payment of any royalties thereon or therefor.

I claim:

1. In a radio frequency echo ranging system, a transmitter for producing radio frequency pulses, said transmitter including an impedance in the cathode circuit of a final transmitting tube thereof for developing potentials in synchronism with said radio frequency pulses, a cathode ray tube including deflecting means, a saw-tooth wave generator controlled by said developed potentials for producing saw-tooth waves in synchronism with said radio frequency pulses, and means applying said saw-tooth waves to said deflecting means.

2. In a radio frequency echo ranging system, a transmitter for producing radio frequency pulses, said transmitter including an impedance in the radio frequency power generating stage thereof for developing potentials in synchronism with said radio frequency pulses, a cathode ray tube including deflecting means, a saw-tooth wave generator controlled by said developed potentials for producing saw-tooth waves in synchronism with said radio frequency pulses, and means applying said saw-tooth waves to said deflecting means.

3. In a radio frequency pulse echo ranging system a pulsed radio frequency power oscillator, a cathode ray tube indicator, a sweep generator coupled to said indicator to produce a time deflection of the electron beam thereof, signal developing means coupled to said power oscillator for deriving control pulses in response to operation of said power oscillator, and means coupling said control pulses to said sweep generator to trigger the same.

ROBERT M. PAGE.

REFERENCES CITED

The following references are of record in the file of this patent:

UNITED STATES PATENTS

| Number | Name | Date |
| --- | --- | --- |
| 2,084,157 | McLennan | June 15, 1937 |
| 2,143,035 | Smith | Jan. 10, 1939 |
| 2,254,344 | Andrieu | Sept. 2, 1941 |
| 2,280,226 | Firestone | Apr. 21, 1942 |
| 2,407,294 | Shockley | Sept. 10, 1946 |
| 2,409,462 | Zworykin | Oct. 15, 1946 |
| 2,419,620 | Young | Apr. 29, 1947 |
| 2,433,838 | Elie et al. | Jan. 6, 1948 |
| 2,481,515 | Isbister | Sept. 13, 1949 |
| 2,494,339 | Keister | Jan. 10, 1950 |